United States Patent [19]

Tomita et al.

[11] 4,360,174
[45] Nov. 23, 1982

[54] CASSETTE TAPE RECORDER

[75] Inventors: Seiji Tomita, Yokosuka; Hideo Yokoyama, Yokohama, both of Japan

[73] Assignee: Tokyo Shibaura Denki Kabushiki Kaisha, Kawasaki, Japan

[21] Appl. No.: 162,446

[22] Filed: Jun. 24, 1980

[30] Foreign Application Priority Data

Jun. 29, 1979 [JP] Japan .............................. 54-89362[U]

[51] Int. Cl.$^3$ ........................ G03B 1/04; G11B 15/32
[52] U.S. Cl. .................................... 242/200; 242/204
[58] Field of Search ...................... 242/186, 197–206; 360/96, 105, 132

[56] References Cited

U.S. PATENT DOCUMENTS

| | | | |
|---|---|---|---|
| 3,724,859 | 4/1973 | Kobler et al. | 242/200 X |
| 4,131,922 | 12/1978 | Yoshida et al. | 360/96 |
| 4,178,809 | 12/1979 | Hanzawa et al. | 74/483 PB |
| 4,209,812 | 6/1980 | Umezawa | 360/96.3 |
| 4,280,154 | 7/1981 | Ando | 360/96.4 |

*Primary Examiner*—Leonard D. Christian
*Attorney, Agent, or Firm*—Cushman, Darby & Cushman

[57] ABSTRACT

A cassette tape recorder comprises a locking mechanism for locking operation sliders for keeping a tape recorder mechanism in a desired operation mode, a stop operation lever for releasing the lock effected by the locking mechanism and for bringing said tape recorder mechanism to a stop mode, an ejecting lever for ejecting a cassette tape in a cassette mounting part of said tape recorder mechanism, and an ejection control mechanism which is controlled by said operation levers, to be non-engageable with respect to said ejecting lever when the operation slider is locked and to be engageable when the operation slider is not locked, said ejection control mechanism operating the ejecting lever to eject the cassette tape through the locking mechanism by a stop operation when it is engageable and when said stop operation lever is operated.

8 Claims, 36 Drawing Figures

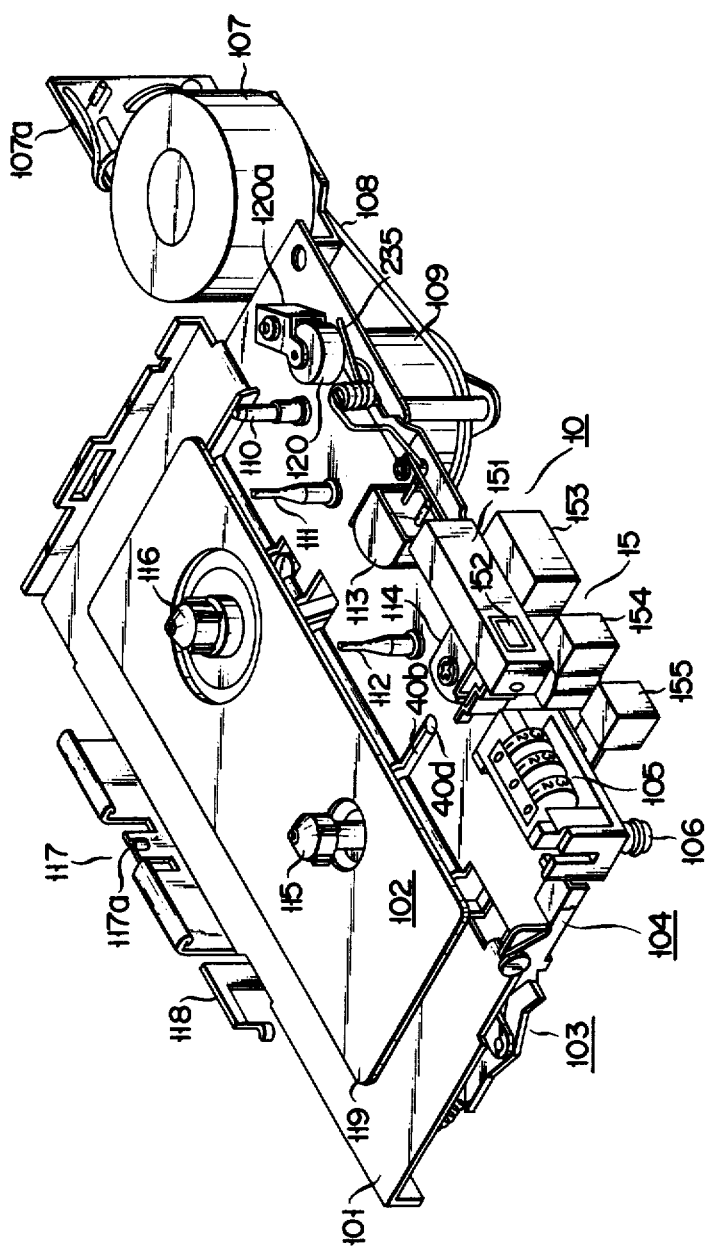
F I G. 2

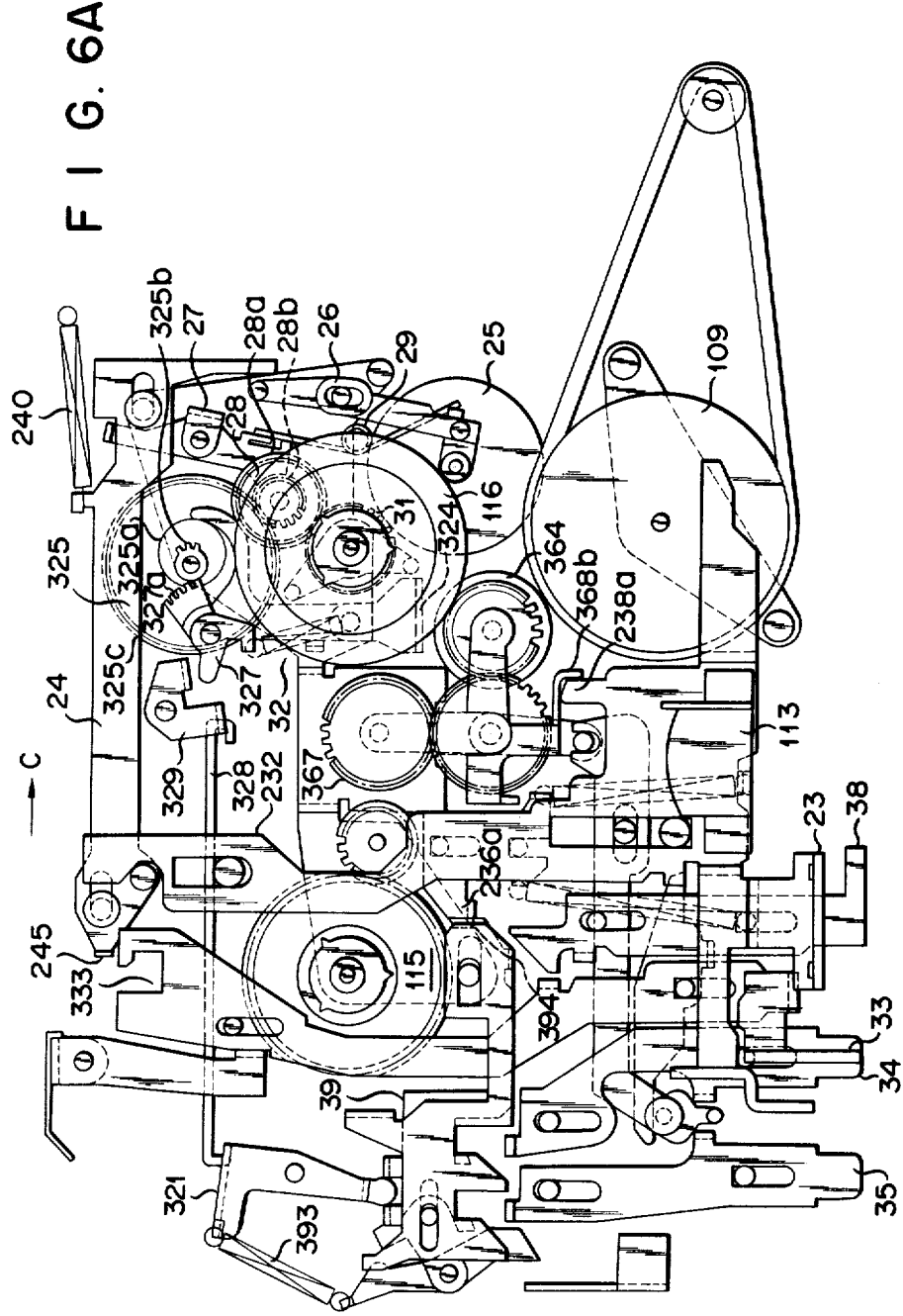

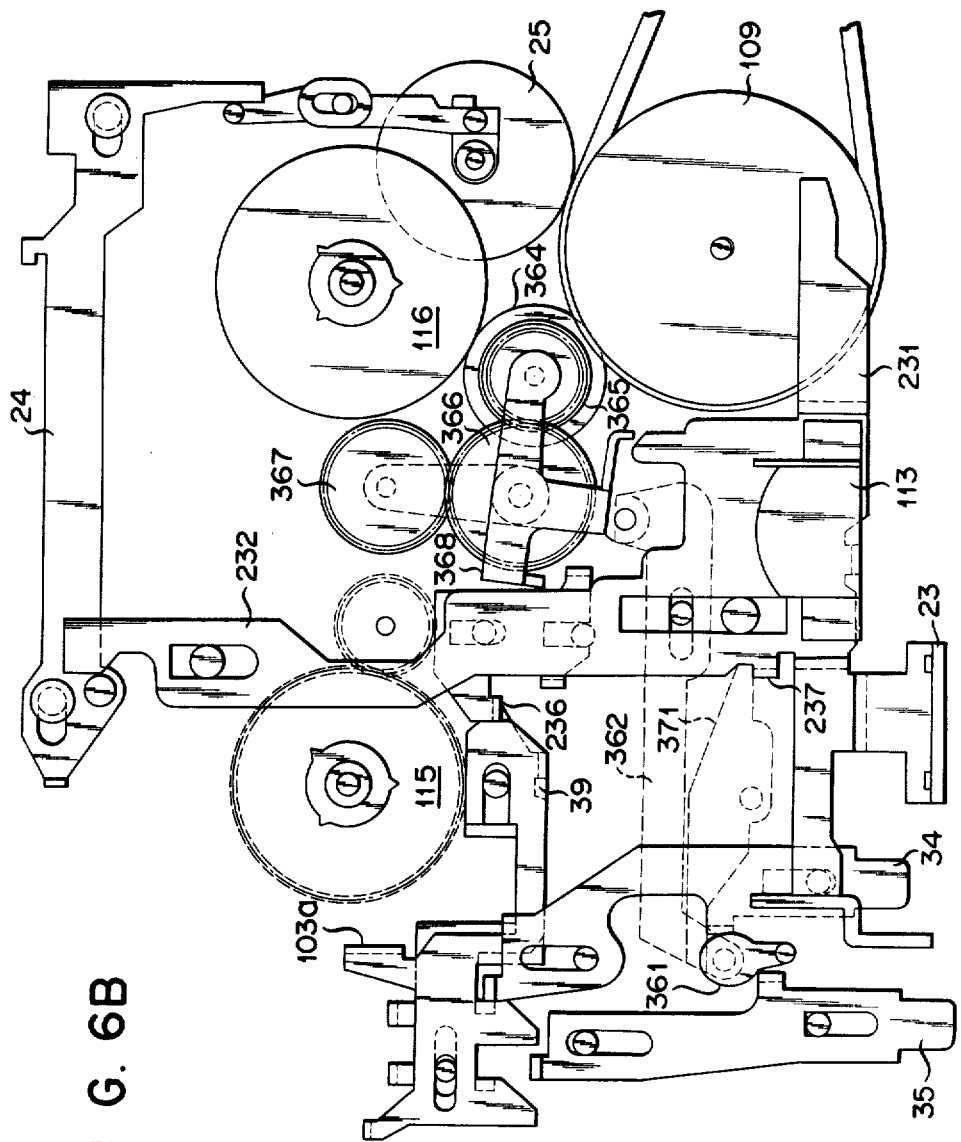

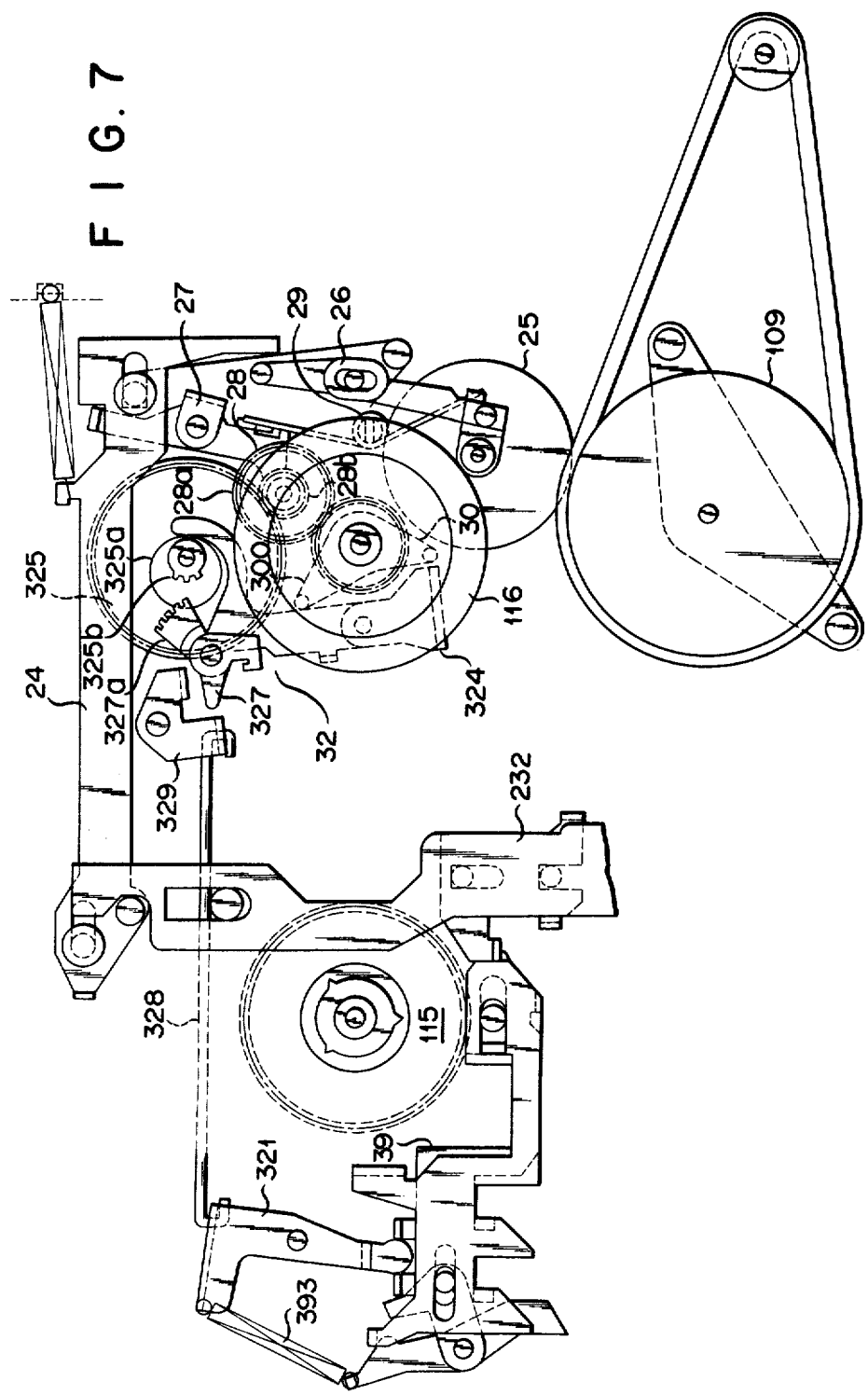

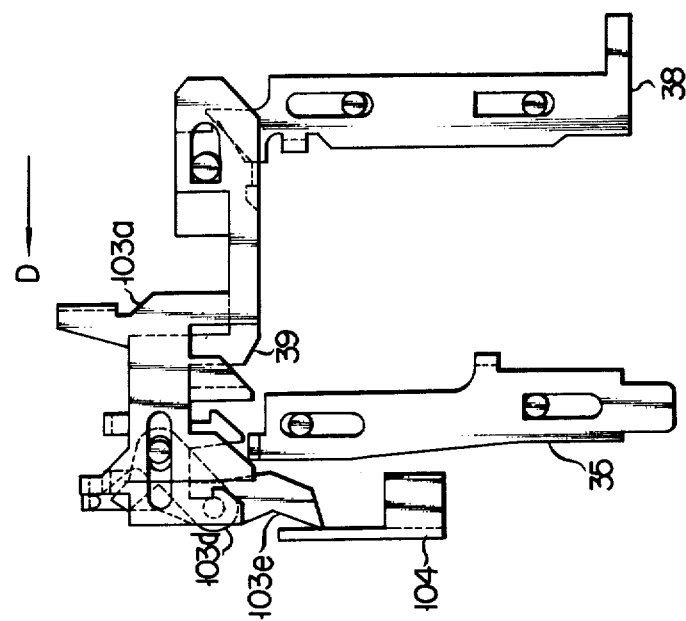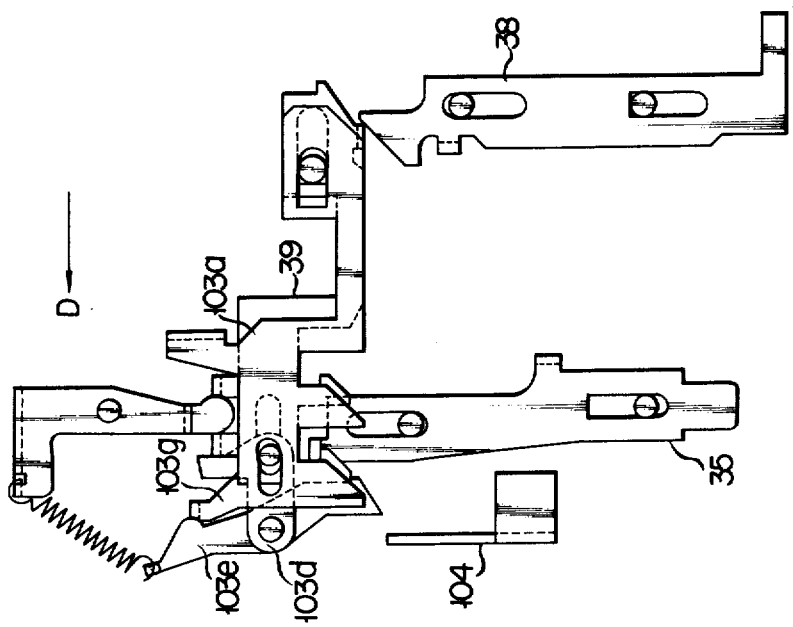

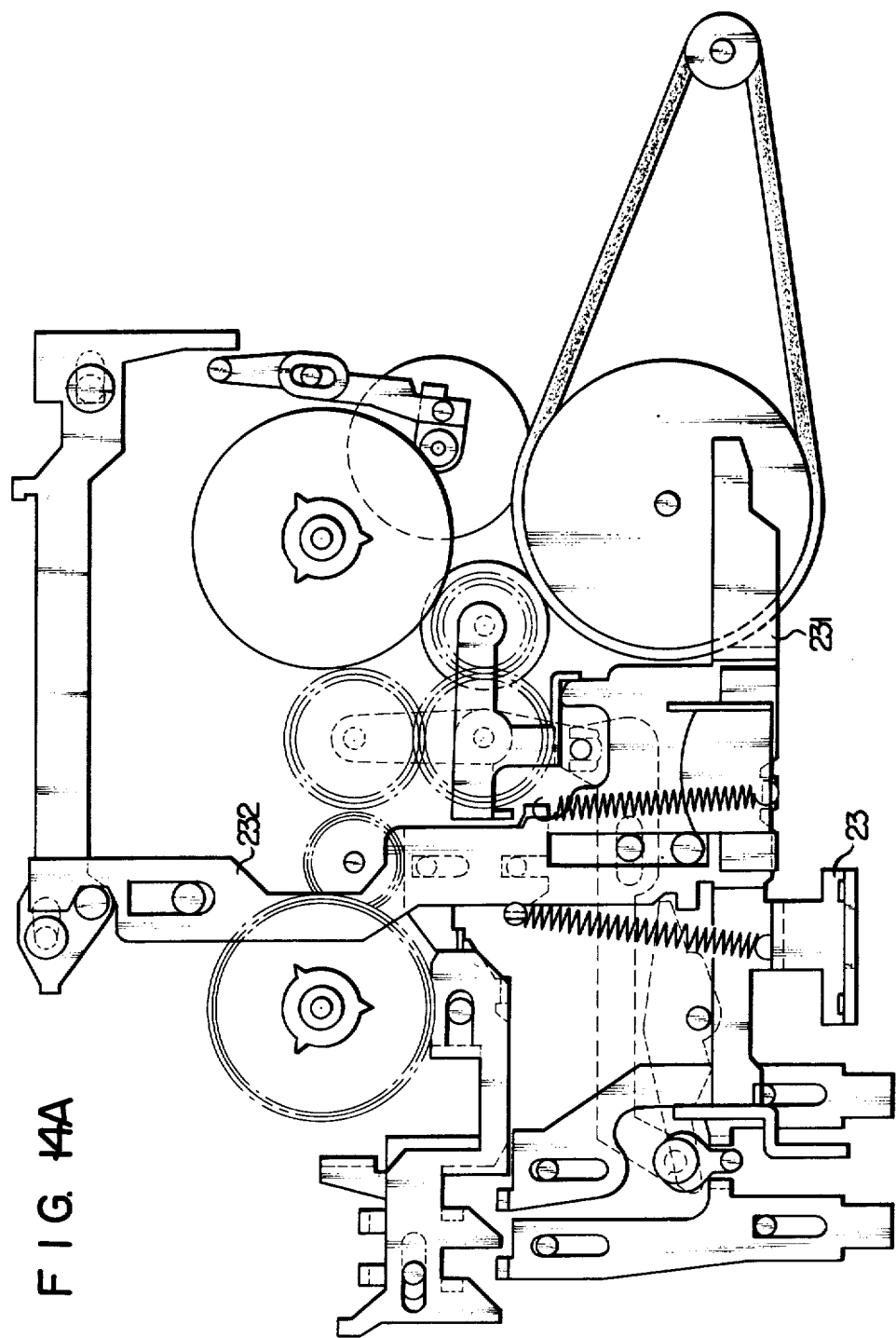

F I G. 14B
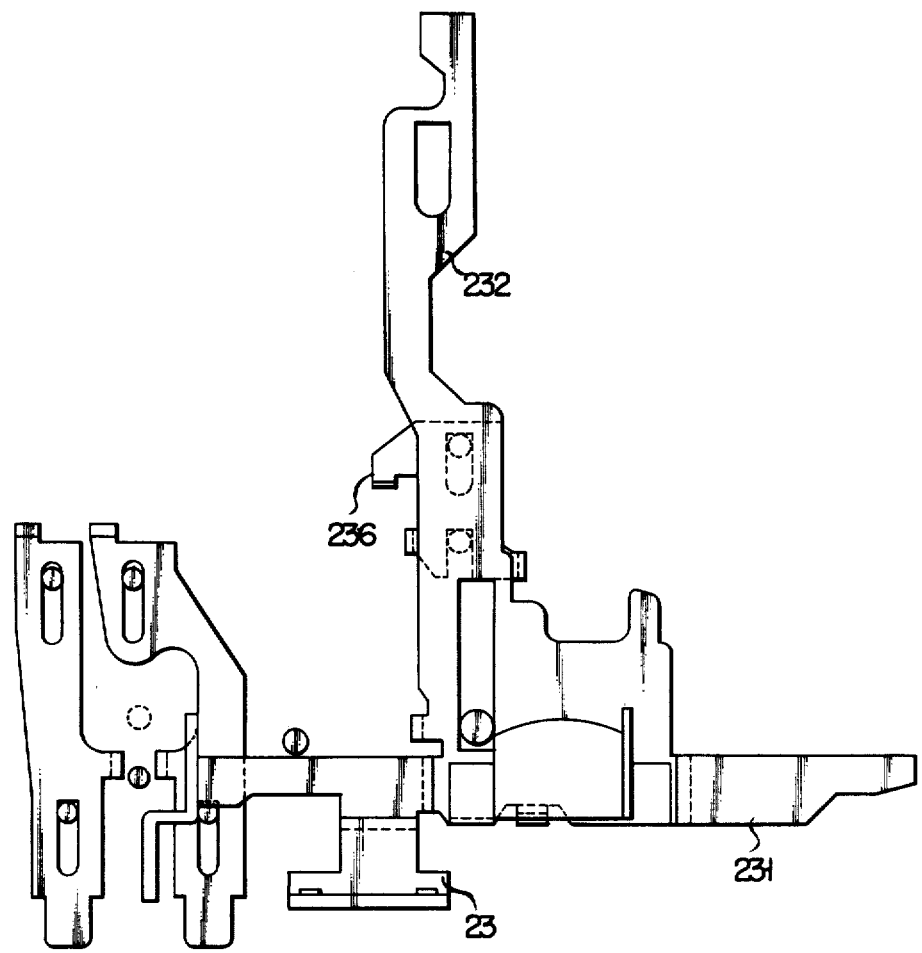

F I G. 14C
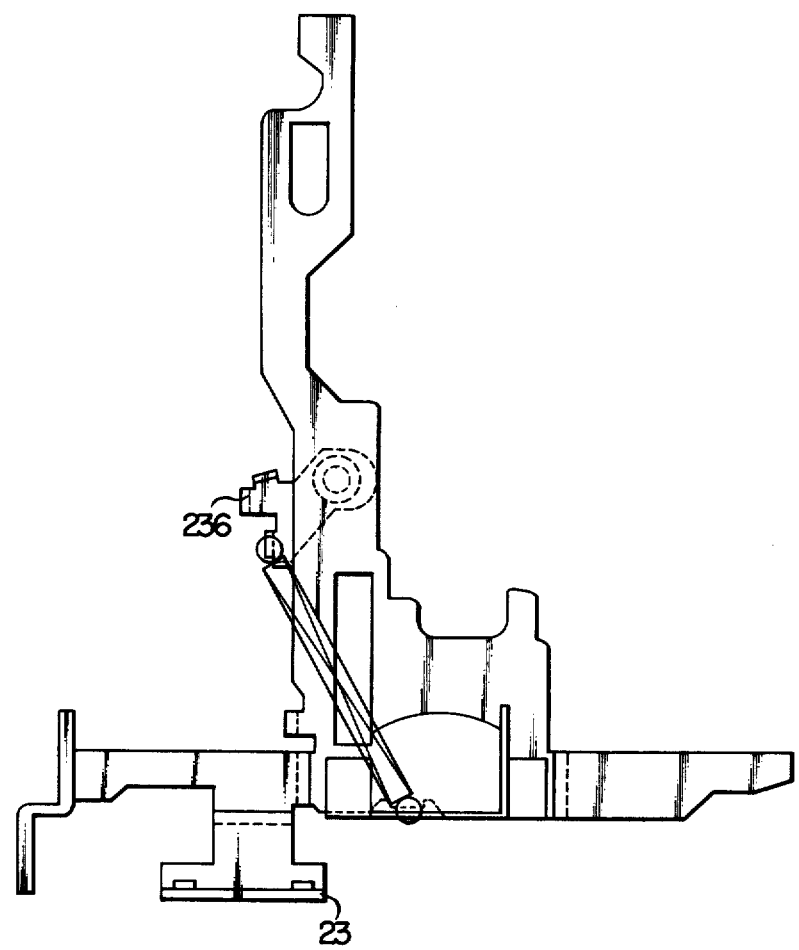

FIG. 15A
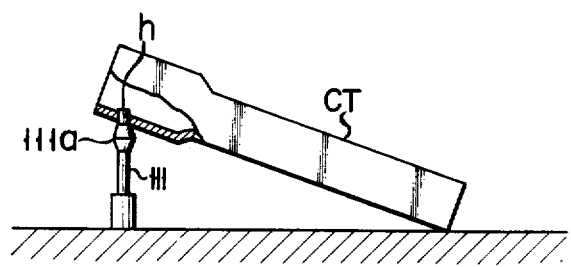
FIG. 15B  FIG. 15C  FIG. 15D
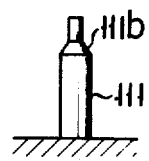 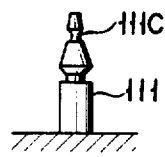 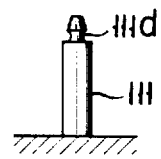

F I G. 16A
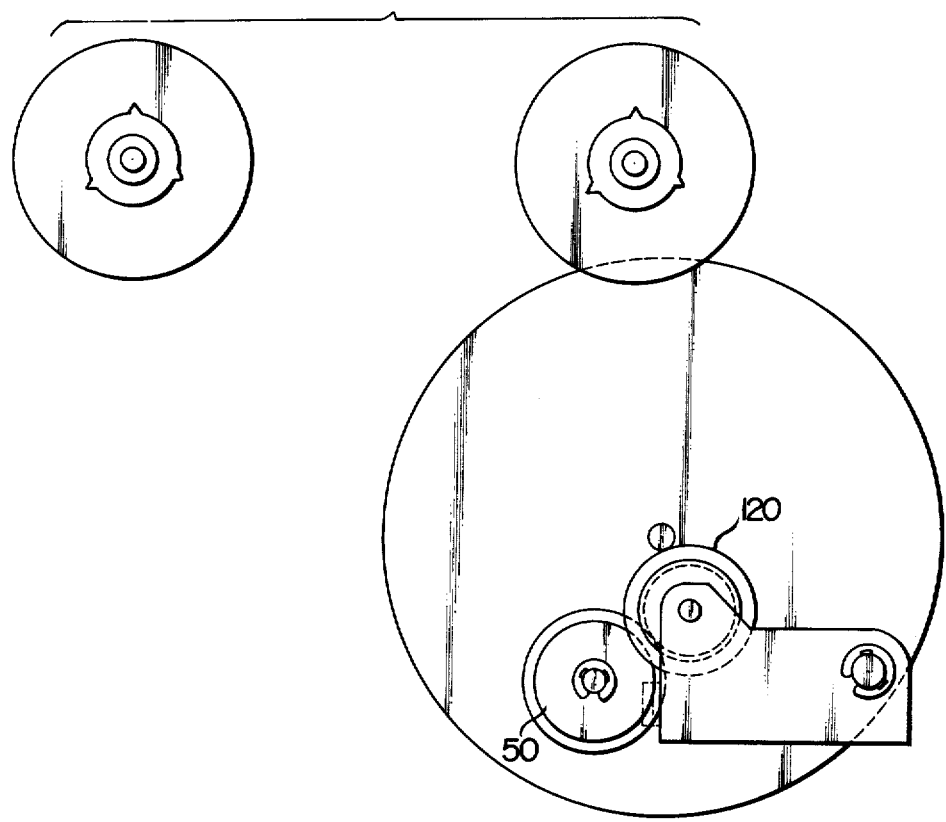
F I G. 16B
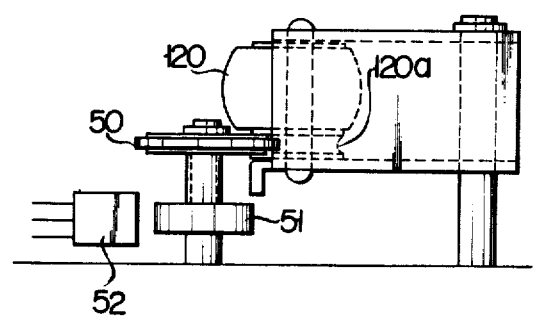

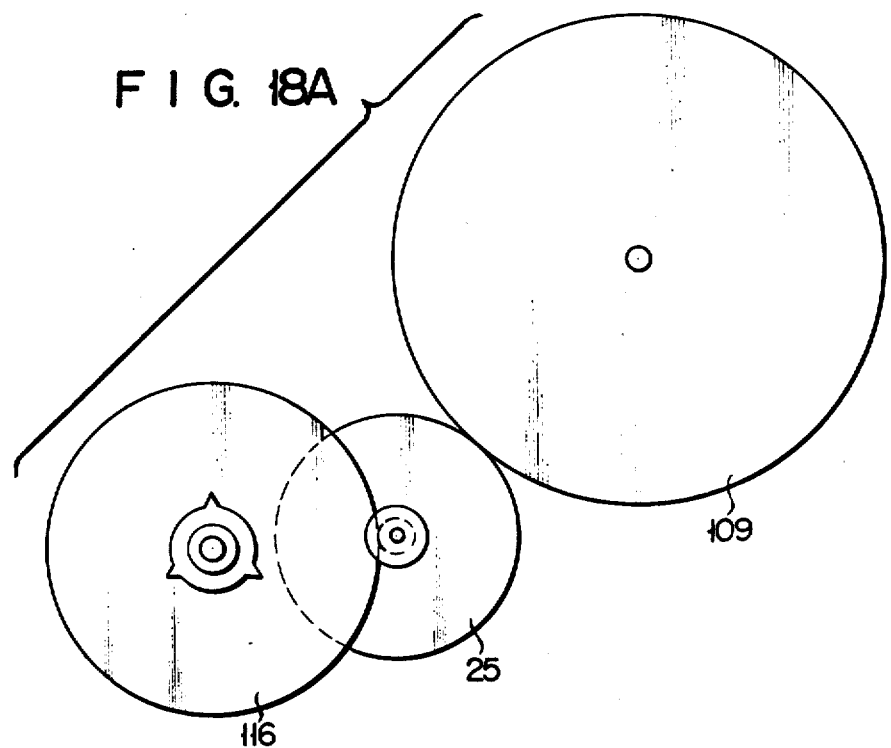
F I G. 18A
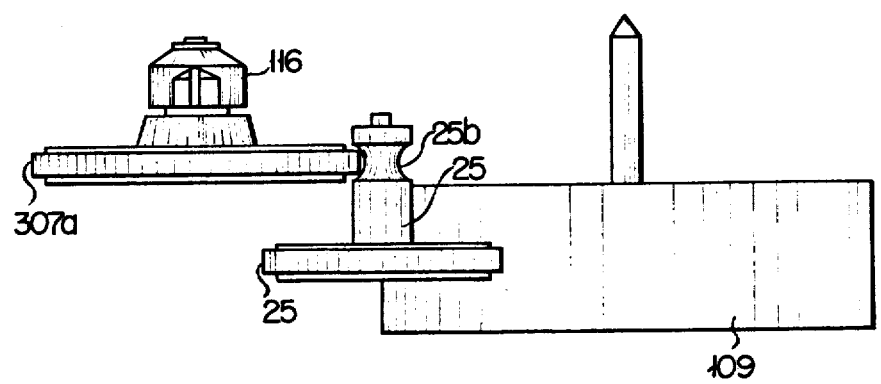
F I G. 18B

CASSETTE TAPE RECORDER

The present invention relates to a cassette tape recorder suitably adapted as a compact (thin) cassette tape recorder.

As is well known, a need to make equipment as compact (thin) as possible has recently arisen in the art of portable audio equipment. This need is also applicable to the case of cassette tape recorders.

In manufacturing a cassette tape recorder which is as compact (thin) as possible, it is possible to manufacture cassette tape recorders for use with a regular cassette tape or with a micro cassette tape. When compactness (thinness) is considered, the latter is more advantageous than the former. However, the former is more popular than the latter. The former is also preferable since it is interchangeable with other types of cassette tape recorders.

The present invention has been made in consideration of these points, and has for its object to provide an improved cassette tape recorder suitably adaptable as a micro (thin) cassette tape recorder for use with a regular cassette tape.

In accordance with the present invention, a cassette tape recorder comprising a locking mechanism for locking an enabling operation member for keeping a tape recorder mechanism in a desired operation mode, a stop operation member for releasing the lock effected by this locking mechanism and for stopping said tape recorder mechanism, and an ejecting member for ejecting a cassette tape in a cassette mounting part of said tape recorder mechanism, is characterized in that an ejection control mechanism is included which is non-engageable with respect to said ejecting member when said enabling operation member is locked and when controlled by said locking mechanism, and which is engageable when said enabling operation member is not locked, said ejection control mechanism operatively biasing the ejecting member when it is engageable and when said stop operation member is operated.

This invention can be more full understood fromthe following detailed description when taken in conjunction with the accompanying drawings, in which:

FIG. 2 is a perspective view of the tape recorder mechanism of FIG. 1;

FIGS. 6A and 6B are views illustrating the operation condition when the mode is changed from the stop mode of FIG. 3 to the cueing or reproducing mode;

FIGS. 7 to 9 are views illustrating the operating condition under which an automatic stop mechanism is operated from the condition of FIG. 6A;

FIGS. 12A to 12F are views illustrating the operations of the ejection control mechanism under the condition of FIGS. 3 and 6A;

FIGS. 14A to 14C are partial views illustrating the head slider part of the mechanism of FIG. 3, and a case wherein a locking member different from that shown in FIG. 3 is used;

FIGS. 15A to 15D are views partially illustrating the cassette guide pin shown in FIG. 2 and its modifications; and FIGS. 16A, 16B to 18A and 18B are plan views and side views for illustrating a rotary transmission system which is different from that shown in FIG. 13.

An embodiment of a cassette tape recorder suitable as a compact (thin) cassette tape recorder will be described with reference to the accompanying drawings.

Figure 1A:
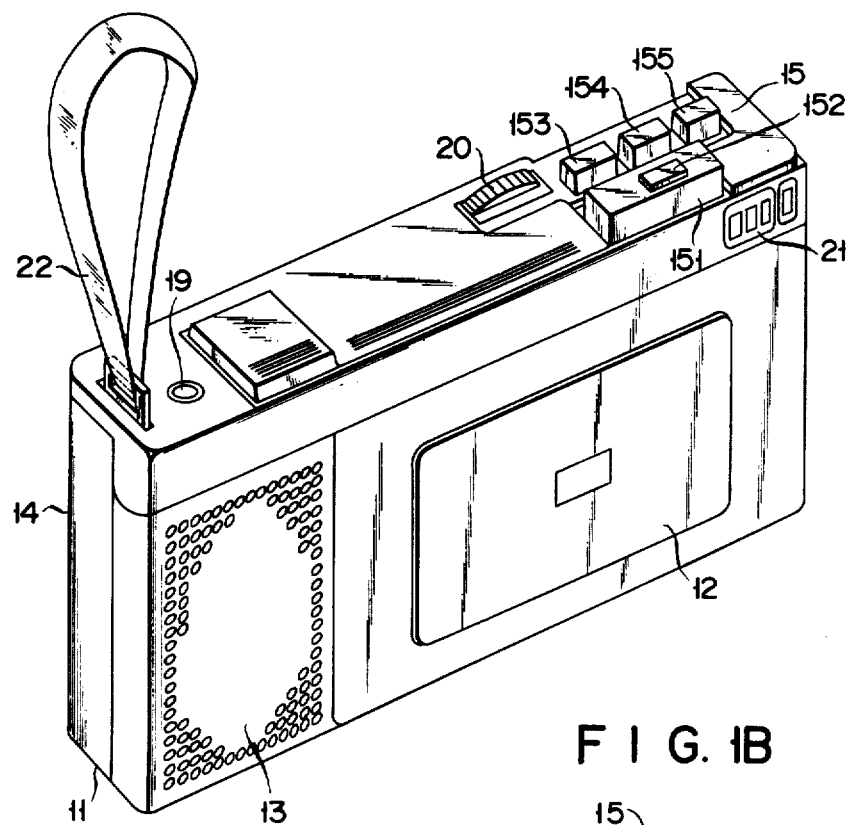
FIGS. 1A and 1B are, respectively, an external perspective view and a right side view of a micro (thin) cassette tape recorder in accordance with one embodiment of the present invention.
Figure 1B:
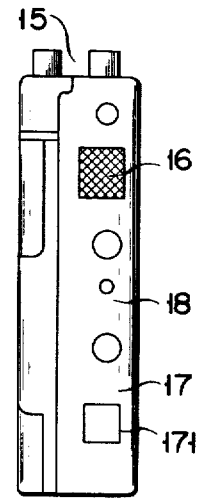

FIGS. 1A and 1B are an external perspective view and a side view, respectively, illustrating a tape recorder mounted in a cabinet 11. Numeral 12 denotes a cassette mounting portion formed at one side of the front of the tape recorder; 13, a speaker encasing part at the other side of the front; 14, a battery encasing part disposed at the back of 13; 15, a main operation part formed at one side of the top of the tape recorder; 16, a built-in microphone encasing part formed at the right side of the tape recorder; 17, a sub-operation part at the same side; 18, a jack part on the same side for outside connections; 19, a jack part formed at the other side of the top for connecting to an external power source; 20, a volume control part formed in the vicinity of the main operation part 15; 21, a tape counter display disposed in the top right corner of the front side; and 22, a band strap formed on the other side of the top near the power jack for carrying the tape recorder.

The main operation part 15 comprises a reproducing operation member 151, a recording operation member 152 housed internally at one side of the reproducing operation member 151, a stop operation and ejecting operation member 153 formed in stepped form in relation to the reproducing operation member 151 and the recording operation member 152, a fast forwarding operation member 154 and a rewinding operation member 155. The suboperation part 17 comprises a pause operation member 171 only.

The tape recorder mechanism 10 shown in FIG. 2 comprises a series of a tape driving mechanism 102, an ejection selection lever 103, an ejection lever 104 and their associated members each formed in association with the operation members 151 to 155 and 171 on the top and bottom surfaces of a main chassis 101 which is formed from a relatively thin metal plate by a press treatment or the like. Each mechanism will be described in more detail hereinafter. The tape driving mechanism 102 denotes all the members associated with the constant drive system as well as the fast forward and rewind high speed driving system, and is capable of a cueing or reviewing function. The names of the members in the drawings will only be described with reference to the associated mechanisms. Numeral 105 denotes a tape counter; 106, a tape counter pulley; 107, a motor; 108, a belt; 109, a flywheel; 110, a capstan coaxial and integral with the flywheel 109; 111 and 112, cassette guide pins; 113, a magnetic recording and reproducing head; 114, an erasing head; 115, a supply reel base; 116, a take-up reel base; 117, a cassette holder spring; 118, an erroneous erasure detection lever; 119, a blinding plate; 120, a pinch roller; and 107a, a printed circuit board for the motor driving circuit.

The cassette holder spring 117 serves to hold as well as to press the cassette tape since a cassette tape press spring part 117a is integrally formed with this spring and has a central part formed in the shape of a tongue which is more flexible than its ends.

Figure 3:
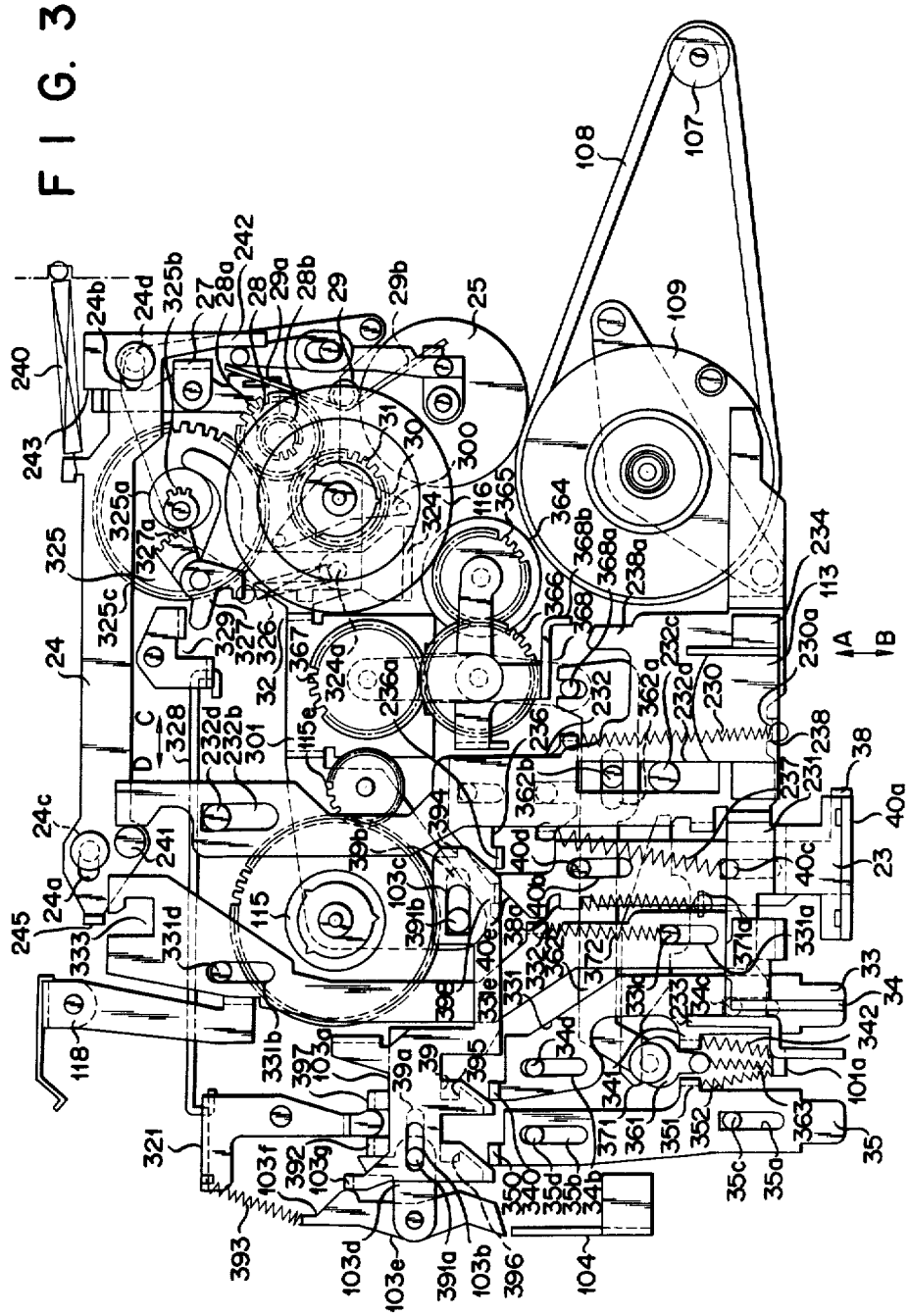
FIG. 3 is a top perspective view of the tape recorder mechanism of FIG. 2 from which the main chassis has been removed.

FIG. 3 is perspective view illustrating the tape recorder mechanism 10 of FIG. 2 from which the main chassis 101 has been removed. The tape recorder mechanism is viewed from above the main chassis for illustrating the parts thereunder. Numeral 23 denotes a head slider attached to the reproducing operation member 151, and this head slider 23 has a T-shape. Its horizontal side 231 is located substantially above the main chassis and its vertical side 232 is located below the main chassis 101. To the left end of the horizontal side 231 of the head slider 23 is attached a tape guide member 233. The central part supports the recording and reproducing head 113 through a head base plate 234. To the right end of the side 231 is attached a spring 235 (not shown in FIG. 3) engageable with a pinch roller lever 120a as shown in FIG. 2. Guide pins 232c and 232d from the main chassis 101 are inserted in elongated holes 232a and 232b formed at the base and the front end of the vertical side 232 of the head slider 23. The head slider 23 is capable of a pressing operation and a returning operation in the direction (A)-(B) shown by the arrows in the figure, due to the attachment of a spring 237 to a locking member 236 which is position-regulated and supported by a tension spring 230 attached between the center of the head slider 23 and an extension 238 of the main chassis 101.

An extended part 230a of the spring 230 is formed integrally with the end of the head slider 23 which is attached to the extension 238 of the head slider 23. The spring is thus capable of being used for pressing a lead wire to be electrically connected to the recording and reproducing head 113 or the like.

Guide pins 24c and 24d are inserted in elongated holes 24a and 24b at both ends of a play slider 24 so that it is displaceable in the direction (C)-(D) shown by the arrows (the play slider 24 is usually biased in the direction (C) by a tension spring 240) shown by the arrows perpendicular to the direction of displacement of the head slider 23, due to engagement of the front end of the head slider 23 with a pin 241 protruding from one end of the play slider 24. An extended part 242 at the other end of the play slider 24 engages with a take-up idler lever 26 which pivotably supports at one end a take-up idler 25 rotatably contacting the periphery of the flywheel 109. A gear lever 27 is pivotably supported at its central part while engaging a notch 243 at the other end of the play slider 24 with one end of the gear lever 27.

An intermediate gear 28 with a coaxial and integral upper big gear 28a and a lower small gear 28b is rotatably supported at the other end of the gear lever 27. A spring 29 is attached by engageable its respective ends 29a and 29b to the other end of the gear lever 27 and one end of the take-up idler lever 26 so that the take-up idler lever 26 and the gear lever 27 are respectively biased in the counterclockwise direction of the figure.

The gears 28a and 28b of the intermediate gear 28 are so disposed as to be free to contact or withdraw from a cam gear 235 of an automatic stop mechanism 32 and from a reel gear base 31 disposed through a slip mechanism 303a and a friction mechanism 30 in a manner to be described later.

Numeral 33 is a recording slider whose lower extension engages with the recording operation member 152 (not shown) as described above. This recording slider 33 supports the erasing head 114 at its lower end which is at the upper part of the head chassis 101. Guide pins 331c and 331d from the main chassis 101 are inserted in elongated holes 331a and 331b formed at the base and the front end so that a vertical side 331 located at the lower part of the main chassis 101 is supported thereby. A spring 332 is attached between an intermediate extension 331e and the guide pin 331c so that the recording slider 33 is capable of pressing and returning operations in the direction (A)-(B) shown by the arrows in the figure.

The front end of the recording slider 33 engages and disengages the other end of the erroneous erasure prevention lever 118. The recording slider 33 is rendered operable or inoperable by the presence or absence of the erroneous erasure prevention pawls of a cassette tape which is mounted in the cassette mounting portion 12. The recording slider 33 is locked when its front end stopping part 333 disengages from an end engaging part 245 of the play slider 24 so that the recording operation member 152 issimultaneously operated with the reproducing operation member 151. The recording slider 33 is not locked in other cases.

Numeral 34 denotes a fast forward slider whose lower end is attached to the fast forwarding operation member 154 (not shown). Guide pins 34c and 34d from the main chassis 101 are inserted in elongated holes 34a and 34b at the base and the front end of the fast forward slider 34. A tension spring 342 is attached between an intermediate extension 341 and an extension 101a of the main chassis 101 so that the fast forward slider is capable of pressing and returning operations in the direction (A)-(B) shown by the arrows in the figure.

Numeral 35 denotes a rewinding slider whose lower end is attached to the rewinding operation member 155. Guide pins 35c and 35d from the main chassis 101 are inserted in elongated holes 35a and 35b at the base and the front end of the rewinding slider 35. A tension spring 352 is attached between an intermediate extension 351 and the extension 101a of the main chassis 101 so that the rewinding slider is capable of pressing and returning operations in the direction (A)-(B) shown by the arrows in the figure.

The intermediate extensions 341 and 351 of the fast forward slider 34 and the rewinding slider 35 are selectively engageable with one end of a high speed drive direction switching member 361 and one end of a cueing and reviewing lever 371. The high speed drive direction switching member 361 is disposed between each central part of these sliders. A guide pin 362b from the main chassis 101 is inserted in an elongated hole 362a near one end of a high speed slider 362 so that it is slidable (pivotable) in the direction (C)-(D) shown by the arrows in the figure. Thus the high speed drive direction switching member 361 is pivotably supported at the other end of the high speed slider 362. Under normal conditions, the high speed drive direction switching member 361 is maintained at the intermediate position as shown in the figure by a spring 363 attached between the extension 101a of the main chassis 101 and the high speed drive direction switching member 361 itself.

The cueing and reviewing lever 371 is disposed at the lower part of the high speed drive direction switching member 361 so that the other end of the lever 371 is capable of engaging and disengaging the extension 237 of the head slider 23. The central part of the cueing and reviewing lever 371 is pivotably supported by the guide pin 331c, and a spring 372 is attached between an extension 371a and an extension 38a of a stop slider 38 so that the lever 371 is biased in the counterclockwise direction of the figure.

A base end part 368a of a high speed switching lever 368 provides about the central axis of an intermediate gear 366 engages with the other end of the high speed slider 362. The high speed slider 362 has at one end a gear 365 coaxial and integral with a high speed idler 364 capable of contacting and separating from the flywheel 109; at its central portion is the intermediate gear 366; and at its other end is a switching gear 367 always engaged with the intermediate gear 366. An engaging piece 368b for engaging and disengaging the engaging piece 238 of the head slider 23 extends from the vicinity of the base 368a of the high speed switching lever 368.

Numeral 39 denotes a locking plate of each operation slider. The locking plate 39 is slidable in the direction (C)-(D) since guide pins 391a and 391b are inserted in small elongated holes 103b and 103c of an ejection control plate 103a and large elongated holes 39a and 39b of the plate. An ejection control lever 103d is pivotably supported by the guide pin 391a at the supporting portion of the locking plate 39, and one end of it engages with an extension 392 of the locking plate 39. An ejection selection lever 103e is pivotably supported at its central portion by the other end of the ejection control level 103d.

A tension spring 393 is attached between one end of the ejection selection lever 103e and a stop control member 321 of the automatic stop mechanism 32. An extension 103g of the ejection control plate 103a engages with an inclined portion 103f of this lever.

Thus, the locking plate 39 is always biased in the direction shown by the arrow (C).

At the front end of the locking plate 39 are formed a first locking part 394 which is able to lock an extension engaging piece 236a of the locking member 236 of the head slider 23, and second and third locking parts 395 and 396 for locking extensions 340 and 350 of the fast forward slider 34 and the rewinding slider 35, respectively. An extension 397 is also formed at the front end of the locking plate 39 for clamping the front end of the stop control member 321 of the automatic stop mechanism 32 to the extension 392.

The stop slider 38 is attached to the stop operation and ejecting operating member 153 as shown in the figure. A guide pin 40c from the main chassis 101 and a guide pin 40d of the slider 38 are inserted in an elongated hole 40a and an elongated hole 40b at the base and front end (See FIG. 2) of the slider 38, and the spring 372 is disposed so that the slider 38 is capable of pressing and returning operations in the (A)-(B) direction shown by the arrows in the figure. A front end inclined portion 40e of the stop slider 38 engages with an extension 398 of the locking plate 39.

The automatic stop mechanism 32 comprises a detection lever 324 pivotable about a shaft 324a when engaged with the friction mechanism 30 disposed at the lower part of the take-up reel base 116; a cam gear 325 whose inner eccentric cam part 325a engages with one end of the detection lever 324; a releasing gear 327 which is pivotably supported at the other end of the detection lever 324 and biased in the counterclockwise direction of the figure since a spring 326 is attached between the releasing gear 327 and the shaft 324a, and which has a sector gear 327a engageable with an inner gear 325b of the cam gear 325; and a releasing lever 329 which is pivotably supported at its central portion so that one end is capable of engaging and disengaging a side of the releasing gear 327, and a rod 328 is disposed between the other end of the releasing lever 329 and the stop control member 321.

An outer gear 325c of the cam gear 325 is selectively engageable with the lower small gear 28b of the intermediate gear 28.

Figure 4:
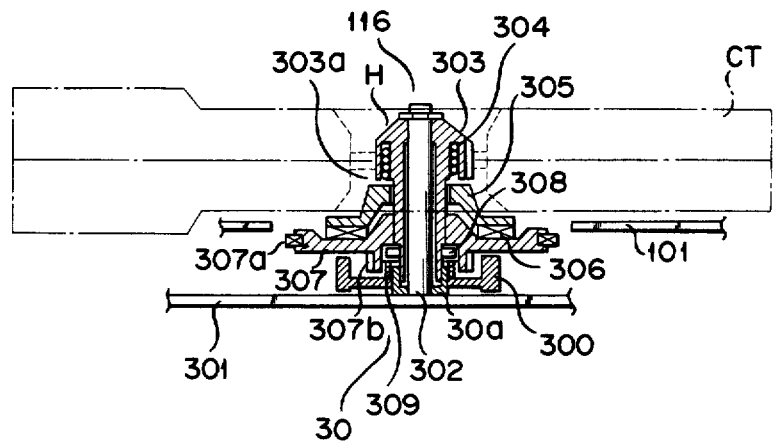
FIG. 4 is a detail view of a take-up reel base and a friction mechanism.

FIG. 4 is a detail view of the friction mechanism 30. The height of the take-up reel base 116 is made as small as possible so as to manufacture as compact (thin) a tape recorder as possible; therefore, the compression spring and the spring receiving part for the slip mechanism are housed in a reel shaft mounting hole H of the cassette case CT. An annular groove is formed at the lower surface of a reel base 303 mounted on the upper part of shaft 302 formed upright on a reel chassis 301, and a compression coil spring 304 is inserted in this groove. A disk-shaped spring receiving part 305 is rotatably supported on the shaft 302, and it is disposed downwardly from the reel base 303 while its central portion protruded toward the reel base 303. The coil spring 304 is compressed and held between the protruded upper surface of the spring receiving part 305 and the end face of the groove of the reel base 303, thus constituting the slip mechanism 303a. Most of these parts are housed within the reel shaft mounting hole H of the cassette case CT.

A reel driving part of a driving wheel 307 is formed through a friction member 306 of, for example, felt at the lower part of the spring receiving part 305. The wheel drives the reel base 303 at high speed or at low speed since its large diameter portion 307a is selectively separated from the switching gear 367 and the small diameter portion of the take-up idler 25.

An elbow-shaped friction plate 300 is formed at the inner lower side of the reel driving part 307 through a friction member 308, a compression spring 309, and a bearing 30a formed in engagement with the lower part of the reel base 303, thus constituting a friction mechanism 30 operating in cooperation with the automatic stop mechanism 32.

Figure 5A:
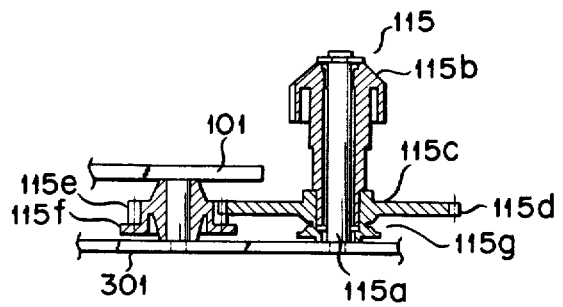
FIGS. 5A to 5D are detail views of parts to be assembled in unitary form into a supply reel base and a reel chassis of the mechanism of FIG. 3.
Figure 5B:
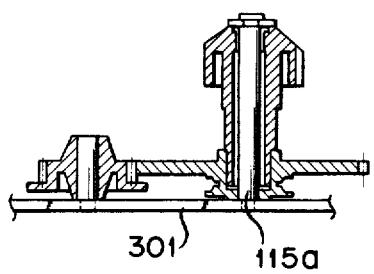
Figure 5C:
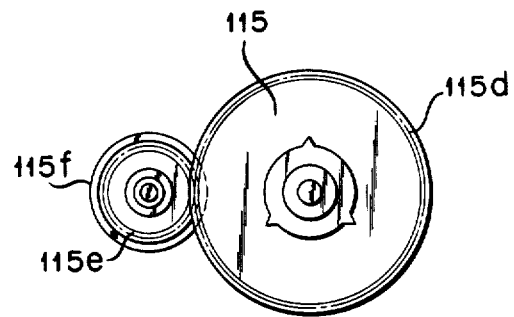

FIG. 5A shows in detail the supply reel base 115 in which a reel base 115b is rotatably mounted on the upper part of a shaft 115a fixed upright on the reel chassis 301 by a stopper. A reel driving part 115c is rotatably mounted at the lower part of the shaft 115a. In this case, a large gear part 115d of the reel driving part 115c is continually engaged with a gear 115e with a collar which is brought into contact and separated from the switching gear 367. Thus high speed drive for selective rewinding is enabled by the reel base 115b.

The reason why a collar has been included in the gear 115e may be explained as follows: In assembly, the gear 115e is mounted on the shaft 115a disposed on the reel chassis 301 which is initially a sub-chassis. A stopper is not used in order to reduce the number of steps of assembly and the number of parts involved. This reel chassis is inverted to be attached to the side of the main chassis 101. At this instance, if there is a collar, this collar portion 115f stops at the large gear part 115d of the reel driving part 115c so that assembly may be accomplished without danger of separation.

Figure 5D:
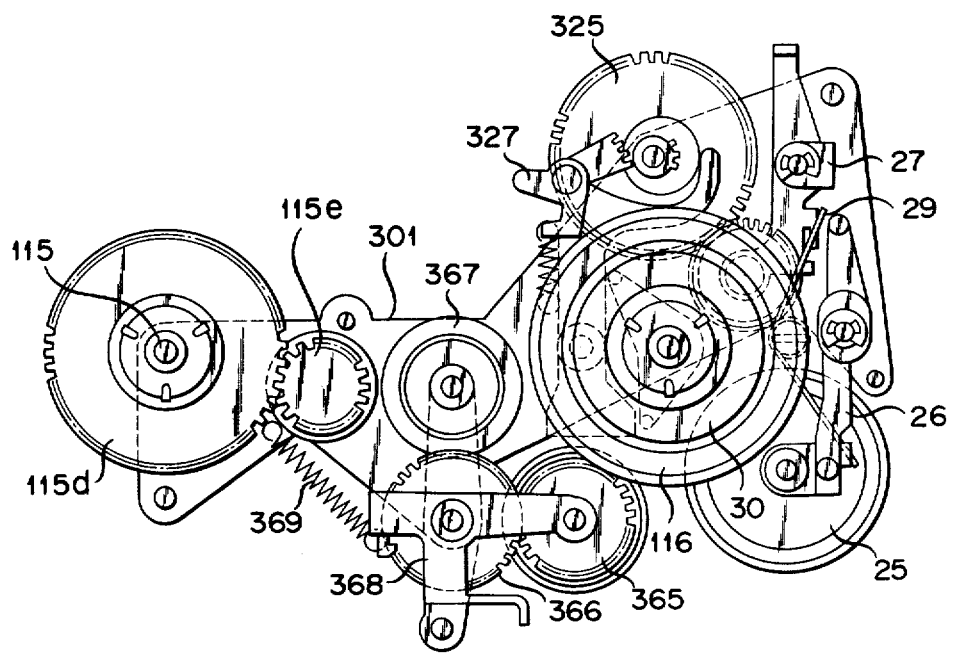

FIG. 5D shows parts prepared in the form of units to be attached to the reel chassis 301 in advance. The same parts are shown by the same numerals as in FIG. 3. Numeral 369 denotes a spring which was not described with reference to FIG. 3 and other figures and which biases the high speed switching lever 368 in the clockwise direction.

A lower part pulley 115e of the supply reel base 115 is connected through a belt (not shown) to the pulley 106 of the tape counter 105 of FIG. 2.

In a micro (thin) cassette tape recorder of this construction, when the reproducing operation member 151 is pressed and the head slider 23 is displaced in the direction of the arrow (A), the extension stopping piece 236a of the locking member 236 engages with a first locking part 394 of the locking plate 39 and is locked in the depressed position. In this procedure, the recording and reproducing magnetic head 113 and the pinch roller 120 on the head slider 23 are brought into predetermined position to make contact with the cassette tape. The play slider 24 is displaced in the direction (C), and the take-up idler lever 26 is pivoted in the clockwise direction. Then, the large and small diameter portions of the take-up idler 25 are brought into contact with the flywheel 109 and the take-up reel base 116, and the constant rotational movement is transmitted to the take-up reel base 116. Then, the reproducing (playback) mode as shown in FIG. 6A is realized wherein the tape is made to travel in the forward direction by the rotation of the flywheel 109 and the coaxial and integral capstan 110.

If the recording operation member 152 and the reproducing operation member 151 are both operated, the front end stopping part 333 of the recording slider 33 is engaged and locked with the engaging part 245 of the play slider 24. When the erasing head 114 is placed at a predetermined position during this procedure and the recording and reproducing switching circuit is switched over by a leaf switch or the like (not shown) to the recording side, the recording mode is attained.

When the head slider 23 is being operated, its engaging piece 238 engages with the engaging piece 368b of the high speed switching lever 368 to pivot the lever 368 in the counterclockwise direction. The high speed idler 364 is separated from the flywheel 109, and no driving force is transmitted to the high speed system.

When the fast forwarding operation member 154 or the rewinding operation member 155 is independently operated, the fast forward slider 34 or the rewinding slider 35 operated in cooperation therewith is locked by a second locking part 395 or a third locking part 396 of the locking plate 39. During this procedure, the intermediate extension 341 or the intermediate extension 351 engages with the high speed drive direction switching member 361 to pivot it in the clockwise or in the counterclockwise direction, thereby displacing the high speed slider 362 in the direction (C) or (D) shown by the arrows (strictly speaking, in a substantially clockwise direction). Then, since the high speed switching lever 368 is pivoted in the clockwise or in the counterclockwise direction, in the former case te fast forward mode is attained wherein the switching gear 367 is brought into contact with the reel driving part 307 of the take-up reel base 116 to displace the take-up reel base 116 in the forward direction in the high speed mode; in the latter case, the rewinding mode is attained wherein the switching gear 367 is connected through the gear 115e with a collar to the supply reel base 115 so that the supply reel base 115 is made to travel at high speed in the reverse direction.

When the operation of the fast forwarding operation member 154 or the rewinding operation member 155 is operated while the reproducing operation member 151 is being operated, the members 154 and 155 are not locked, but the intermediate extension 341 or 351 is engaged with one end of the cueing and reviewing lever 371 to pivot it in the counterclockwise direction. Then the other end of the lever 371 engages with the extension 237 of the head slider 23 which was not engaged when the reproducing operation member 151 was not in operation, and a cueing operation (see FIG. 6(b)) or a reviewing operation is attained wherein the head slider 23 is slightly pressed in the direction of the arrow (B) due to the presence of the locking member 236 displaced by the tension spring 230.

In any of the preceding operating modes such as reproducing (recording), fast forwarding and rewinding, when the stop operation member 153 is operated, a front inclined part 40a of the stop slider 38 operating in cooperation therewith engages the extension 398 of the locking plate 39 and displaces it in the direction (D) against the biasing force exerted by the tension spring 393. Thus, any of the first through third locking parts 394-396 of the locking plate 39 may be released. The stop operation is thus accomplished.

The pause operation member 171 is mainly operated when it is desired to temporarily stop the tape travel when the tape recorder is in the recording (reproducing) mode. A pause may be easily realized by a mechanical pause device such as a push-push mechanism (not shown) operable in cooperation with the pause operation member 171 or by an electric pause device for turning off the power source of the motor 107.

When the stop operation member 153 is operated in the stop mode, a so-called double action type cassette ejection is possible according to which the ejection lever 104 ejects the mounted cassette tape. This will be described in more detail hereinafter.

The operation of the automatic stop mechanism 32 will now be described. However, it must be noted that the automatic stop mechanism 32 operates only in the reproducing (recording) mode as described hereinbefore.

The mechanism in the condition shown in FIG. 6A is in the reproducing (recording) mode. During the process of displacing the play slider 24 in the direction of the arrow (C) in cooperation with the held slider 23, the gear lever 27 is also pivoted in the clockwise direction and the upper big gear 28a and the lower small gear 28b of the intermediate gear 28 engage with the reel base gear 31 (corresponding to 307b in FIG. 4) of the take-up reel base 116 and the outer gear 325c of the cam gear 325, respectively. That is, in the fast forwarding and rewinding modes, the play slider 24 is not operated at all and the cam gear 325 thus is driven in the reproducing (recording) mode alone for enabling the automatic stop function.

The detection lever 324 which detects the stop of the take-up reel base 116 is pressed by the friction plate 300 of the friction mechanism 30 and biased in the counterclockwise direction while the take-up reel base 116 is rotating. The detection lever 324 repeats the clockwise and counterclockwise movements along the inner eccentric cam part 325a of the cam gear 325 which engages it at one end. Thus, in this condition, the sector gear 327a of the releasing gear 327 does not engage with the inner small gear 325b (a notched gear having teeth only partially) of the cam gear 325.

Figure 8:
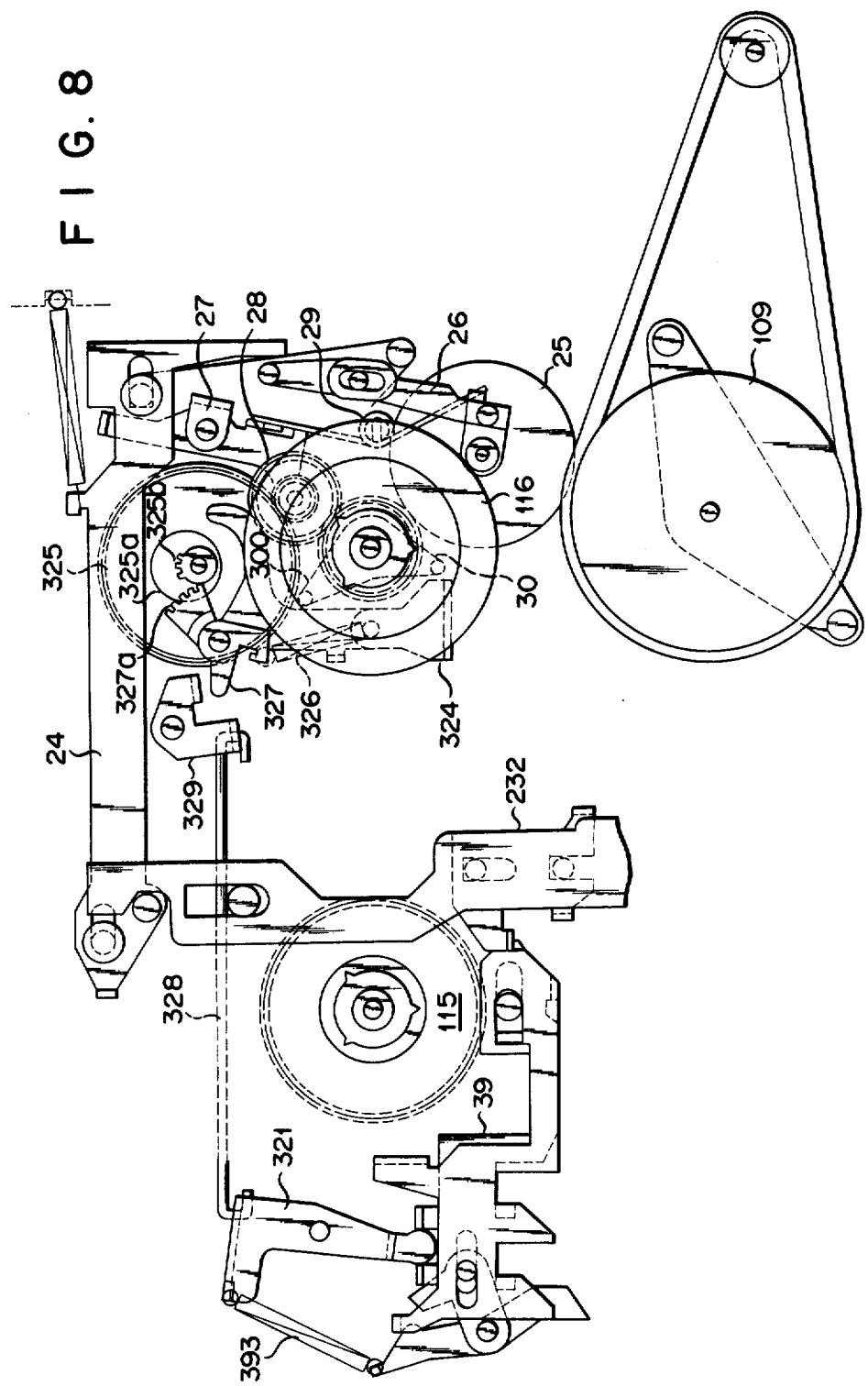
Figure 9:
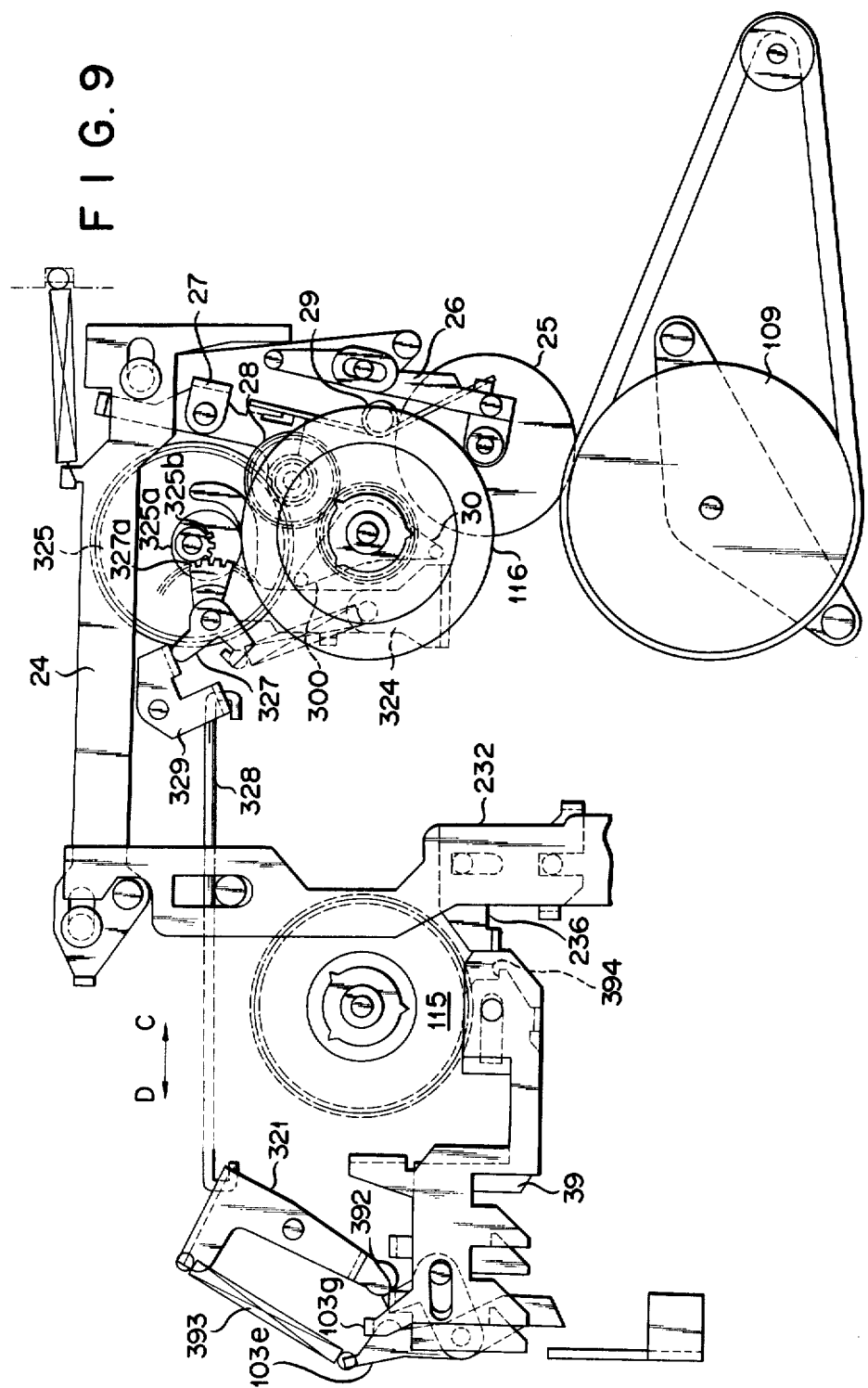

However, when the reel base 303 stops due to a tape end or other reasons, the biasing force of the friction plate 300 in the counterclockwise direction disappears, and the detection lever 324 is pressed to the maximum radial position of the eccentric cam part 325a in the clockwise direction of FIG. 8.

Then, when the inner small gear 325b of the cam gear 325 engages with the reel base gear 31 rotating independently of the tape travel, it is turned by the slip mechanism 303a and is renderend engageable with the sector gear 327a of the releasing gear 327. Then, since the releasing gear 327 is pivoted in the clockwise direction, one side engages with one end of the releasing lever 329 to pivot it in the counterclockwise direction. Then the stop control member 321 is pivoted in the clockwise direction through the rod 328. Since the front end of the stop control member 321 presses the extension 392 of the locking plate 39 in the direction (D) of the figure, a series of automatic stop functions is completed for releasing the head slider 23 locked by the first locking part 394 of the locking plate 39.

When the automatic stop function is completed, the engagement between the inner small gear 325b of the cam gear 325 and the sector gear 327a of the releasing gear 327 is released. The releasing gear 327 is returned in the clockwise direction by a spring 326 and the automatic stop mechanism 32 itself is returned in preparation for the next operation.

The first characteristic of the automatic stop mechanism 32 is that the releasing gear 327 as a releasing member is directly supported on the detection lever 324 as a detecting member for detecting the stop of the reel base. In a conventional automatic stop mechanism of this type, the detecting member and the releasing member are not directly asociated, and the releasing member is operated through an intermeiate member which operates in response to the detecting member. Thus, the construction was complex and the mechanism was disadvantageous for compactness (thinness). Further, this required a complex cam releasing mechanism for returning the detecting member after the automatic stop operation. On the other hand, with the automatic stop mechanism 32 as described above, the releasing member is directly supported on the detecting member so that these defects are eliminated.

The second characteristic of the automatic stop mechanism 32 of this construction is that the driving force of the cam gear 325, that is, the lock releasing force for the locking plate 39 is obtained from the take-up reel base 116, that is, the right reel base. This means that the automatic stop mechanism 32 and the intermediate gear 28 are switched over for control so that the automatic stop mechanism 32 operates only in the reproducing (recording) mode and not in the fast forwarding or rewinding mode. This greatly contributes to the efficient operation of the automatic stop mechanism 32 itself and enables a more compact (thin) tape recorder.

Figure 10:
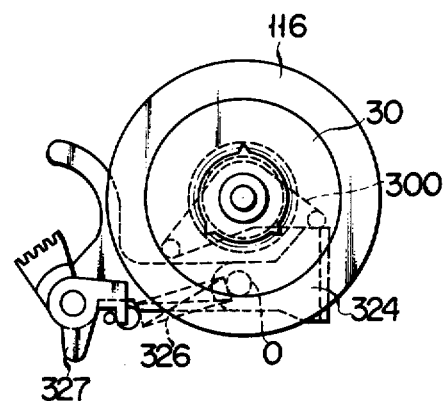
FIG. 10 is a partial view of the automatic stop mechanism included in FIG. 3.

A third characteristic of the automatic stop mechanism 32 is that, as shown in FIG. 10, the friction plate 300 is engaged at both sides of the pivotal fulcrum O of the detection lever 324 so as to correct the weight balance of the detection lever 324 so that the automatic stop mechanism 32 does not operate in an erroneous manner, regardless of the position (inclination) of the tape recorder, without requiring a special construction of the detection lever 324 for balancing the weight.

The first characteristic of the micro (thin) tape recorder as a whole is that the hight of the reel base is made small for attaining compactness (thinness) of the tape recorder by housing the compression spring 304 and the spring receiving part 305 for the slip mechanism 303a in the cassette case CT.

The second characteristic is that the blinding plate 119 (see FIG. 2) with a roughened surface is disposed at the bottom of the cassette mounting part, that is, the protruding part of the reel bases 115 and 116. This blinding plate 119 serves to hide each mechanism and its mounting part on the main chassis 101 from the outside, and it is roughened so as to prevent in advance contamination such as finger prints which may be left in mounting or dismounting a cassette tape.

The same effect of preventing of contamination may be obtained by coloring and flatting the surface of the blinding plate 119 instead of roughening it.

Figure 11:
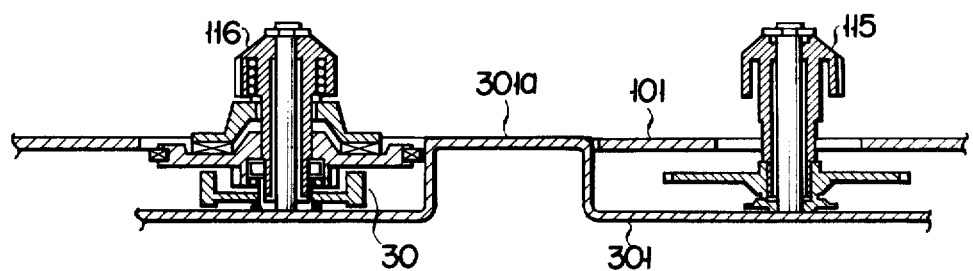
FIG. 11 is a detail view in which the reel chassis shown in the mechanism of FIG. 2 functions as a blinding plate.

Further, as is shown in FIG. 11, the central portion of the reel chassis 301 for mounting the reel bases 115 and 116 may be extended and protruded to a height substantially the same as the height of the main chassis 101 so as to form a blinding portion 301a.

A tape counter display may be disposed on such a blinding part (plate), and this is particularly effective when the cassette case is transparent.

The third characteristic is that the gear 115e with a collar is adopted in assembling the associated parts of the reel chassis 301 in a unitary form and attaching it to the main chassis 101. With this construction, the gear 115e may not be separated after attachment without requiring a stopper, so that the number of parts to be used is reduced and the working efficiency is improved.

The fourth characteristic is the mechanism of controlling the ejection lever 104 by the locking plate 39. The ejection lever 104 is adopted to eject a mounted cassette tape. When the ejection operating plate for operating the ejection lever 104, or as in the present embodiment, the double-action type stop operation member 153 (the stop slider 38 in practice) is separated from the ejection lever 104, the ejection lever 104 cannot be directly operated so that some kind of intermediate member is required. However, in the embodiment of the present invention, the ejection lever 104 is controlled by utilzing the locking plate 39 operating in cooperation with the stop slider 38 without requiring an intermediate member. Thus, the ejection lever 104 is selectively driven to eject a cassette tape.

Figure 12A:
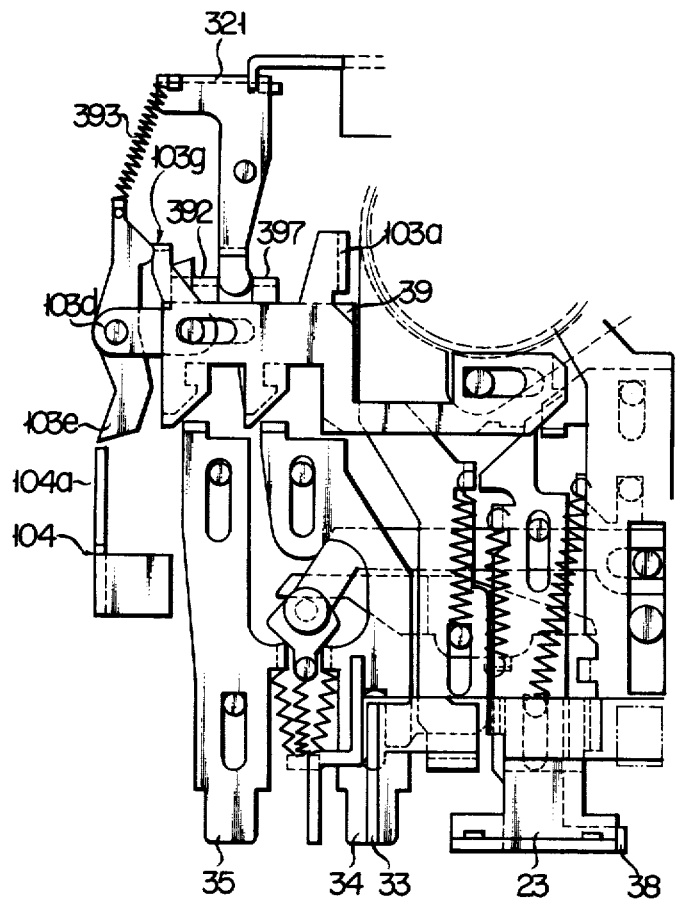

FIGS. 12A through 12F show an ejection lever control mechanism 104a taken from FIG. 3. In FIG. 12A, the mechanism is in the stop mode, that is, the ejection selection lever 103e and the ejection control lever 103d are drawn by the tension spring 393 so that the selection lever 103e is regulated to be in contact with the extension 103g at one lend of the ejection control plate 103a. Under this condition, the ejection selection lever 103e and the ejection lever 104 are engageable.

Figure 12B:
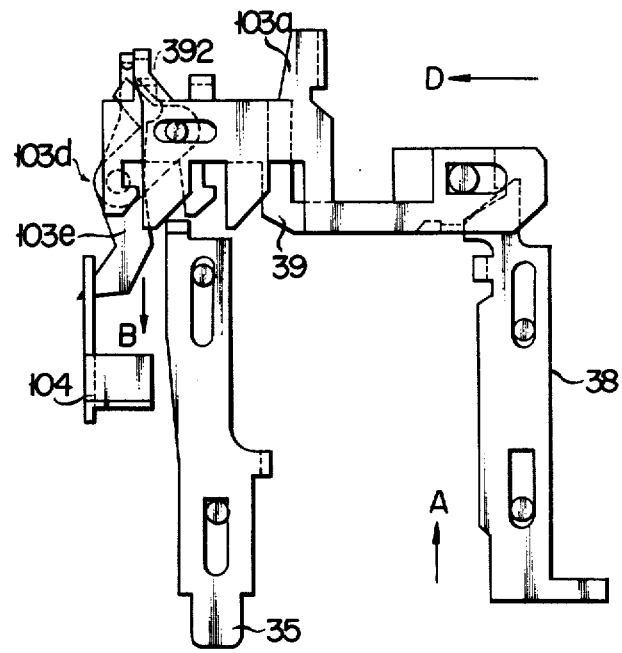
Figure 12C:
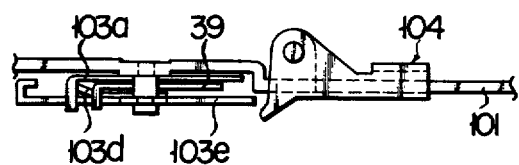
Figure 12D:
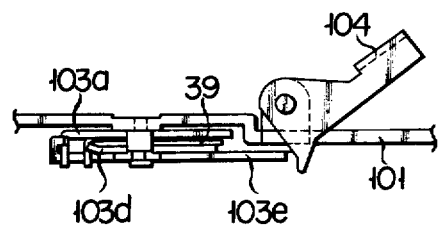

When the stop operation member 153 is operated in the direction shown by the arrow (A) under this stop mode, the locking plate 39 is displaced in the direction shown by the arrow (D) through the stop slider 38 as shown in FIG. 12B, and its extension 392 presses one end of the ejection control lever 103d to pivot it in the counterclockwise direction of the figure. Then the ejection selection lever 103e pivotably supported on the ejection control lever 103d is displaced in the direction shown by the arrow (B). During this displacement, it engages with the ejection lever 104 to pivot it in the counterclockwise direction from the stop condition shown in FIG. 12C to the position of FIG. 12D. The bottom of the mounted cassette case (not shown) is pressed upward, and the cassette tape is ejected.

In any operation mode, as typically shown by the case of the rewinding mode shown in FIG. 12E, the extension 103g at one end of the ejection control plate 103a, being displaced in the direction shown by the arrow (D), pivots the ejection selection lever 103e in the counterclockwise direction of the figure so that the ejection selection lever 103e and the ejection lever 104 are engageable. When the stop operation member 153 is operated under this condition, only the lock of the rewinding slider 35 is released as shown in FIG. 12F; the ejection selection lever 103e engages with the ejection lever 104 and returns in the clockwise direction to the stop position.

The double action of the stop operation member 153 is thus enabled, and cassette ejection is accomplished utilizing the locking plate 38 in this manner.

Figure 13:
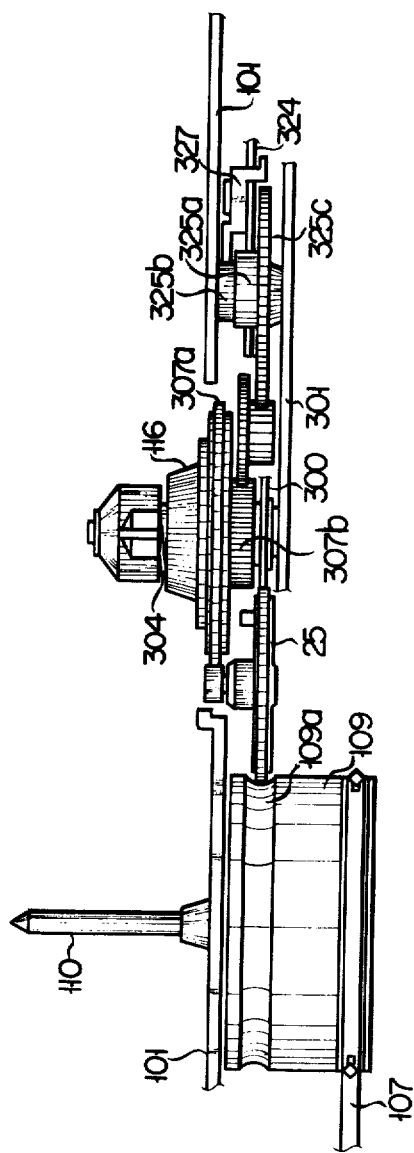
FIG. 13 is a detail view illustrating the rotary transmission system of the take-up reel base.

The fifth characteristic is shape of the flywheel 109 which has an engaging groove for contacting the idler. In a micro (thin) tape recorder, the idler must also be made as thin as possible. However, then the length of the idler bearing part becomes short and the idler tends to be inclined. This might result in the irregular rotation, adversely affecting wow and fluttering characteristics. However, as shown in FIG. 13, a curved engaging groove 109a is formed at the part of the outer circumference of the flywheel 109 which contacts the take-up idler 25 so as to prevent the take-up idler 25 from being inclined. This eliminates irregular rotation and does not adversely affect the wow and fluttering characteristics. In this embodiment, the high speed idler 364 also contacts the groove 109a of the flywheel 109.

The sixth characteristic is that a single spring 393 (FIGS. 3, 6-9, and 12) is organically constructed to serve in three different functions: to provide a general lock release for each operation slider; to exert a returning force when the lock is released by the transmitted force of the automatic stop mechanism 32; and to exert the returning force of the ejection selection lever 103e for ejecting the cassette tape.

The general lock release for each operation slider is effected by the action of the stop slider 38 on the locking plate 39 to displace it in the direction shown by the arrow (D). Thereafter, three biasing forces are required: a first biasing force for returning (same as in the case of locked condition) the locking plate 39 in the direction shown by the arrow (C); a second biasing force for returning the stop control member 321 after the lock release as an automatic stop action effected by the force transmitted from the stop control member 321 when the automatic stop mechanism 32 is in operation; and a third biasing force for returning the ejection selection lever 103e which selectively ejects the cassette tape. Thus, generally three springs are required for this purpose. However, with the present invention, the single tension spring 393 serves to function in these three different ways and is interposed between the base part of the stop control member 321 and the rear end of the ejection selection lever 103e.

The seventh characteristic is that, as shown in FIG. 14A in which the head slider 23 is shown as the stop slider 38 is removed from FIG. 3, the head slider 23 functions both as a conventional reproducing operation plate and as a head chassis, and a displaceable or pivotable locking member 236 is disposed on the head slider 23. With this construction, the reproducing (recording) mode may be easily obtained with efficient and organic construction, and the cueing and reviewing mode can easily be attained.

FIG. 14B shows the head slider 23 with a slidable locking member 236 isolated from the rest of the assembly.

FIG. 14C shows the head slider 23 with a pivotable locking member 236 acting like a lever.

The eighth characteristic is the provision of a (cassette) guide pin for secure operation of ejecting a cassette tape. In a compact (thin) tape recorder of this type, the force to eject the cassette tape tends to be insufficient. Thus, if the guide pin is straight or tapered, after the cassette tape is ejected, the cassette tape tends to drop back in the mounted position when the ejection operation member is released. In accordance with the present invention, as shown in FIG. 15A, the (cassette) guide pin 111 (normally, a pair of them) has sufficient height to reach the upper surface of the cassette tape when it is in the mounted condition. A bead-shaped stopping part 111a is formed on the upper part of the cassette guide pin 111. Once the cassette tape is ejected, the edge of the guide hole h of the cassette case CT engages with a stopping part 111a of the guide pin 111 so that it is easy to take out the cassette.

The guide pin 111 may have stopping parts 111b-111d of the shapes shown in FIGS. 15B to 15D. The guide pin may also have other suitable shapes.

The above-mentioned fifth characteristic will be described in more detail. In the micro (thin) tape recorder shown in FIGS. 16A and 16B, the generation of undesirable phenomena such as entangling of the tape is detected through the stop of the pinch roller 120. An engaging groove 120a is formed on the outer circumference of the pinch roller 120 so as to contact a detecting rotary body 50, and a hole element 52 for detection is formed in the vicinity of a rotary magnet 51 coaxial and integral with the rotary body 50.

Figure 17A:
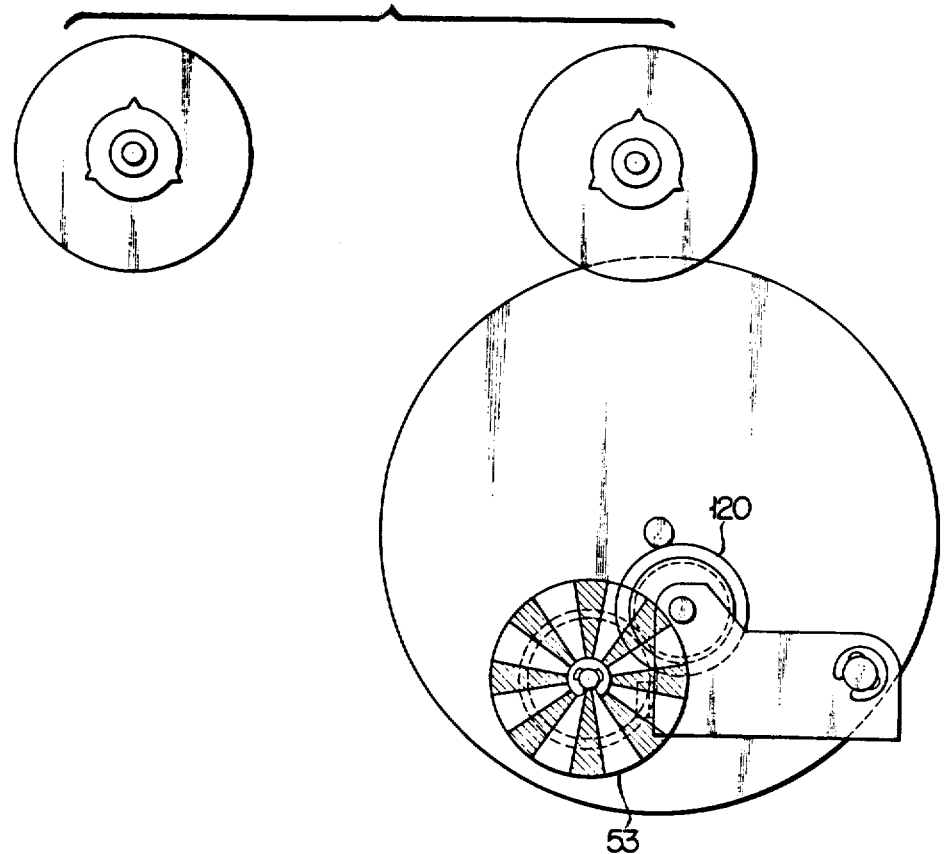
Figure 17B:
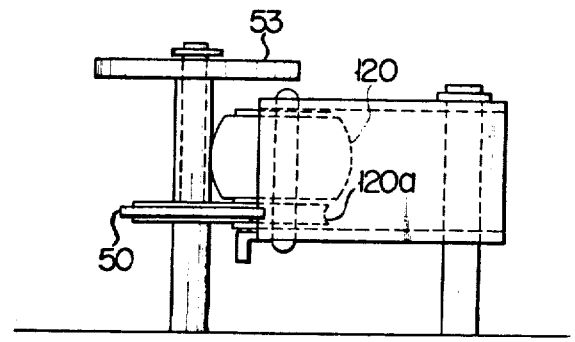

In FIGS. 17A and 17B, the same mechanism is employed for a tape travel display mechanism having the rotary body 50 in contact with the engaging groove 120a of the pinch roller 120, and a rotary display body 53 with streak patterns coaxial and integral with the rotary body 50.

In the embodiment of FIGS. 18A and 18B, an engaging groove 25b is formed on the outer circumference of a shaft part 25a of the take-up idler 25 to which the rotation of the flywheel 109 is transmitted. The reel driving part 307a of the take-up reel base 116 contacts the engaging groove.

It is to be understood that, in general, the same principle may be applied in a similar manner to a rotary transmission part of a tape recorder.

The stop operation and ejection operation member was designed to be in the same row as the rewinding operation member and the fast forwarding member. However, it may be formed in the same row as the recording or reproducing operation members.

In summary, in accordance with the present invention, a tape recorder is provided which comprises a locking mechanism for locking each enabling operation member for placing the tape recorder mechanism in a desired operation mode, a stop operation member for releasing the lock effected by this locking mechanism and for stopping the tape recorder mechanism, and an ejection member for ejecting a cassette tape from the cassette mounting part of the tape recorder mechanism; said tape recorder is characterized in that an ejection lever control mechanism is included which is non-engageable when said enabling operation member is locked with respect to said ejecting member when controlled by said locking mechanism, and which is engageable when said enabling operation member is not locked, said ejection lever control mechanism operatively biasing the ejecting member when it is engageable and when said stop operation member is operated. Thus, a tape recorder is provided which may be easily adapted as a micro (thin) tape recorder.

It is to be understood that the present invention is not limited to the description and the accompanying drawings, and various modifications and changes may be made without departing from the scope and sprit of the invention.

What we claim is:

1. In a cassette tape recorder comprising a locking mechanism for locking an enabling operation means for keeping a tape recorder mechanism in a desired operation mode, a stop operation means for releasing the lock effected by the locking mechanism and for bringing said tape recorder mechanism to a stop mode, and an ejecting means for ejecting a cassette tape to an ejected position; the improvement which comprises an ejection control mechanism which is non-engageable with respect to said ejecting means when said enabling operation means is locked and which is engageable when said enabling operation means is not locked, said ejection control mechanism operating the ejecting means to eject the cassette tape through the locking mechanism when it is engageable and when said stop operation means is operated.

2. A cassette tape recorder as claimed in claim 1 wherein said enabling operation means comprises a rewinding operation member having a rewinding slider movable to effect a rewinding operation, a fast forwarding operation member having a fast forward slider movable to effect a fast forwarding operation, and a reproducing member having a reproducing slider movable to effect a reproducing operation, wherein said stop operation means includes a stop slider movable to release the locked state; and wherein said locking mechanism includes a locking plate which engages with said rewinding slider, said fast forwarding slider, and said reproducing slider to lock each and which slides by the operation slider to release said lock.

3. A cassette tape recorder as claimed in claim 2 wherein said locking plate is slidable in the longitudinal direction with one end engageable with said stop slider and the other end located at the side of said ejection means.

4. A cassette tape recorder as claimed in claim 3 wherein said ejection control mechanism has an ejection control lever which is displaced as said locking plate is displaced, and an ejection selection lever which is pivotably disposed at the other end of said locking plate and which is engageable with the ejection means when said ejection control lever is displaced by the rewinding slider, the fast forward slider or the reproducing slider, and when the ejection selection lever is pivoted in one direction by the ejection control lever; which is non-engageable when the stop slider is displaced due to the displacement of the stop slider effected by the released lock of the locking plate, and which operates the ejecting means through the locking plate and the ejection control lever when said stop slider is displaced while the operation means is in an inoperative position.

5. A cassette tape recorder as claimed in claim 1 which includes at least one guide pin having a stepped portion to contact the cassette tape ejected to a maximum stroke and to maintain this ejected condition.

6. A cassette tape recorder as claimed in claim 1 further comprising a capstan, a flywheel for rotating the capstan, and a rotary transmission wheel which contacts the flywheel and which is rotated by the rotational force of the flywheel, said flywheel having an annular groove on its circumference in which is inserted part of the rotary transmission wheel.

7. A cassette tape recorder as claimed in claim 1 further comprising a stationary shaft, a reel base which is rotatably supported on the stationary shaft and which has an annular groove at one end face, a disk-shaped spring receiving part which has a central part protruding in the direction of said one end face of the reel base and which is rotatably supported on said stationary shaft, a coil spring which is inserted in said annular groove in such a manner that it is compressed between said central part of said spring receiving part and the end face of the annular groove of said reel base, a reel driving wheel rotatably supported on said stationary shaft, and a take-up reel base having a friction member interposed between the driving wheel and said spring receiving part, said spring receiving part and coil spring located within the cassette tape.

8. In a cassette tape recorder comprising a locking mechanism for locking an enabling operation means for keeping a tape recorder mechanism in a desired operation mode, a stop operation means for releasing the lock effected by the locking mechanism and for bringing said tape recorder mechanism to a stop mode, and an ejecting means for ejecting a cassette tape in a cassette mounting part of said tape recorder mechanism; the improvement which comprises an ejection control mechanism which is controlled by said enabling operation means, to be non-engageable with respect to said ejecting means when said enabling operation means is locked and to be engageable when said enabling operation means is not locked, said ejection control mechanism operating the ejecting means to eject the cassette tape through the locking mechanism by a stop operation when it is engageable and when said stop operation means is operated.

* * * * *